US010061854B2

(12) United States Patent
Gharpure et al.

(10) Patent No.: US 10,061,854 B2
(45) Date of Patent: *Aug. 28, 2018

(54) TRUSTED MAPS: UPDATING MAP LOCATIONS USING TRUST-BASED SOCIAL GRAPHS

(71) Applicant: Google Inc., Mountain View, CA (US)

(72) Inventors: Chaitanya Gharpure, Mountain View, CA (US); Charles L. Chen, Sunnyvale, CA (US); Tiruvilwamalai Venkatraman Raman, San Jose, CA (US)

(73) Assignee: Google LLC, Mountain View, CA (US)

(*) Notice: Subject to any disclaimer, the term of this patent is extended or adjusted under 35 U.S.C. 154(b) by 374 days.

This patent is subject to a terminal disclaimer.

(21) Appl. No.: 14/321,226

(22) Filed: Jul. 1, 2014

(65) Prior Publication Data
US 2014/0317107 A1    Oct. 23, 2014

Related U.S. Application Data

(63) Continuation of application No. 12/749,441, filed on Mar. 29, 2010, now Pat. No. 8,812,585.

(51) Int. Cl.
G06F 15/16 (2006.01)
G06F 17/30 (2006.01)
(Continued)

(52) U.S. Cl.
CPC .. *G06F 17/30867* (2013.01); *G06F 17/30241* (2013.01); *G06Q 10/00* (2013.01);
(Continued)

(58) Field of Classification Search
CPC ............. G01C 21/32; G01C 21/3476; G01C 21/3682; G06F 17/30241; H04M 3/42348;
(Continued)

(56) References Cited

U.S. PATENT DOCUMENTS 6,216,130 B1    4/2001 Hougaard et al.
7,177,623 B2    2/2007 Baldwin
(Continued)

OTHER PUBLICATIONS

Chang, F. et al., "Bigtable: A Distributed Storage System for Structured Data," 7th USENIX Symposium on Operating Systems Design and Implementation, 2006, pp. 205-218 of the *Proceedings*, 14 pages.
(Continued)

*Primary Examiner* — Tom Y Chang
(74) *Attorney, Agent, or Firm* — Dority & Manning, P.A.

(57) ABSTRACT

A system and method for updating and correcting the location of geospatial entities, the method comprising receiving at a server from a mobile device operated by a first user, a proposed location for a geospatial entity, the proposed location determined by a wireless location system, and based upon a current location of the mobile device; providing information about the proposed location for the geospatial entity to a first plurality of other users; receiving votes from the first plurality of users as to whether the proposed location is correct and responsive to the received votes, determining whether to update the location information for the geospatial entity.

20 Claims, 13 Drawing Sheets

(51) Int. Cl.
  *G06Q 10/00* (2012.01)
  *H04L 29/06* (2006.01)
  *H04L 12/58* (2006.01)
  *H04N 21/475* (2011.01)
  *G07C 13/00* (2006.01)

(52) U.S. Cl.
  CPC ....... *H04L 65/403* (2013.01); *G06Q 2230/00* (2013.01); *G07C 13/00* (2013.01); *H04L 51/32* (2013.01); *H04L 2209/463* (2013.01); *H04N 21/4758* (2013.01)

(58) Field of Classification Search
  CPC .............. H04L 51/32; H04L 2209/463; H04N 21/4758
  USPC .................. 707/724, 736; 701/409, 532, 537
  See application file for complete search history.

(56) References Cited

U.S. PATENT DOCUMENTS

| | | | |
|---|---|---|---|
| 7,373,385 | B2 | 5/2008 | Prakash |
| 7,822,631 | B1 | 10/2010 | Vander Mey et al. |
| 2003/0036848 | A1 | 2/2003 | Sheha et al. |
| 2004/0001114 | A1 | 1/2004 | Fuchs et al. |
| 2005/0114354 | A1 | 5/2005 | Singh |
| 2005/0270299 | A1 | 12/2005 | Rasmussen et al. |
| 2005/0278386 | A1 | 12/2005 | Kelley et al. |
| 2006/0212931 | A1 | 9/2006 | Shull et al. |
| 2007/0072585 | A1 | 3/2007 | Johnson et al. |
| 2007/0087756 | A1 | 4/2007 | Hoffberg |
| 2007/0121596 | A1 | 5/2007 | Kurapati et al. |
| 2007/0264618 | A1 | 11/2007 | Fuller |
| 2007/0281689 | A1* | 12/2007 | Altman .............. G06Q 30/0207 455/435.1 |
| 2008/0046274 | A1 | 2/2008 | Geelen et al. |
| 2008/0201156 | A1 | 8/2008 | Abhyanker |
| 2009/0024315 | A1 | 1/2009 | Scheibe |
| 2009/0024589 | A1 | 1/2009 | Sood et al. |
| 2009/0043786 | A1 | 2/2009 | Schmidt et al. |
| 2009/0112474 | A1* | 4/2009 | Chakrapani et al. ............. 702/5 |
| 2009/0182780 | A1 | 7/2009 | Wong et al. |
| 2010/0023259 | A1* | 1/2010 | Krumm .................. G01C 21/20 701/532 |
| 2010/0030459 | A1 | 2/2010 | Geelen et al. |
| 2010/0070930 | A1 | 3/2010 | Thibault |
| 2010/0153451 | A1 | 6/2010 | Delia et al. |
| 2010/0332118 | A1* | 12/2010 | Geelen et al. ................ 701/201 |
| 2010/0332119 | A1 | 12/2010 | Geelen et al. |
| 2011/0087745 | A1* | 4/2011 | O'Sullivan ............ G06Q 10/10 709/206 |
| 2011/0131172 | A1* | 6/2011 | Herzog .................. G06Q 10/10 706/58 |
| 2012/0110006 | A9 | 5/2012 | Lubarski et al. |
| 2013/0067357 | A1* | 3/2013 | Rose ...................... G06F 3/048 715/760 |
| 2013/0125211 | A1 | 5/2013 | Cashman et al. |

OTHER PUBLICATIONS

Helft, M. "With Tools on Web, Amateurs Reshape Mapmaking," The New York Times, Jul. 27, 2007, 3 pages.
Popa, G. "Google Adds Exciting My Maps Feature," Apr. 5, 2007 [Online} [Retrieved on Oct. 5, 2009] Retrieved from the Internet http://news.softpedia.com/news/Google-Adds-Exciting-My-Maps-Feature-51295.shtml.
U.S. Appl. No. 12/270,580, filed Nov. 13, 2008, La Forge et al.
U.S. Appl. No. 12/209,159, filed Sep. 11, 2008, Katragadda et al.
"WikiMapia," Wikipedia, Last Modified Oct. 17, 2009, 3 pages, [online] [retrieved on Oct. 21, 2009] Retrieved from the internet <URL:http://en.wikipedia.org/wiki/WikiMapia>.
PCT International Search Report and Written Opinion, PCT/US2011/030280, dated May 23, 2011, 8 Pages.
United States Office Action for U.S. Appl. No. 12/749,441, dated Jun. 1, 2012, 30 pages.
United States Office Action for U.S. Appl. No. 12/749,441, dated May 1, 2013, 40 pages.
United States Office Action for U.S. Appl. No. 12/749,441,, dated Oct. 7, 2013, 39 pages.

* cited by examiner

TRUSTED MAPS: UPDATING MAP LOCATIONS USING TRUST-BASED SOCIAL GRAPHS

BACKGROUND OF THE INVENTION

Field of the Invention

The present invention is related to a system and method for updating and adding locations of geospatial entities and providing the updated location to an online hosted map system using trust-based social graphs.

Description of the Background Art

Maps frequently include incorrect information and the current approaches to correcting that information are laborious and expensive. Assessing whether or not a map is accurate traditionally requires sending expert observers to the mapped location. Experts are used to ensure that information is reliable and of sufficient quality for the map maker's usage.

Because of the expense, some map providers update their maps infrequently. Additionally, the expense of acquiring map data result in the map and its data being proprietary to the map provider. This adds to the cost of providing maps to users whether it is in hard copy form or on through online media, such as the World Wide Web.

Because of the prevalence of portable navigation systems, which pinpoint individual addresses for users, users of maps expect more accuracy from maps than in the past when looking at a paper map rarely allowed for pinpointing an individual address. Inaccuracies in maps are therefore more noticeable and burdensome now than in the past.

There are some online hosted map hosting systems that allow individual end users to make suggestions for corrections to the system's maps. These system require that the correction proposed by the user be reviewed and approved by an expert reviewer. In some such approaches, only after a user has built up credibility by having a large number of suggestions approved, are the user's proposed changes accepted without review. This approach is therefore still labor intensive and expensive, requiring a large number of expert reviewers to approve users' suggested changes.

Errors from incorrect and outdated maps lead to very frustrating experiences for users. For example, a user may obtain driving directions from a map hosting system, but then get lost while following such directions because there was an error in the map data, such as the destination business being a block further down the street than indicated on the map, or a change in the roads due to construction.

SUMMARY OF THE INVENTION

A system and method for updating and adding locations of geospatial entities to maps provided by an online map hosting system allows a user to provide location information regarding a changes or correction to be made to a map, and receives votes from other users of the system to determine the trustworthiness of the provided location information. This system and method have the advantage of updating and correcting maps by tapping users of the maps as resources thereby avoiding the expense associated with current approaches to updating and correcting map information.

In one aspect, a user of the system has a client device, such as a smartphone, PDA, GPS navigation unit, or the like, which is enabled to determine its location. The user is present at some location at which a geospatial entity is present. The location of the client is determined by a wireless location system and provided to the client device. The user enters information (such as tags, keywords, and the like) into the client device to provide a description of the entity. The client device transmits a location tag, which comprises the location and the user's description of the geospatial entity, to the system. A geospatial entity for which the user has provided a description is called a proposed location. The entity may be a new entity that was not previously on the map or a correction of an incorrect location on a map for the geospatial entity.

Proposed locations are provided to other users of the system via their respective client devices. These users provide feedback to the system as to the trustworthiness of the proposed locations. The feedback is in the form of a vote that the other user agrees or disagrees with the proposed location. The system processes the votes to determine a trust metric for the proposed location, and responsive to the value of the trust metric for the proposed location the proposed location is accepted as correct and provided to the online map hosting system.

Optionally proposed locations are provided to multiple subsets of other users wherein one subset is associated with the user who tagged the location. Additional subsets of users are less associated or not associated with the user who tagged the location. Votes from the multiple subsets are used in the trust metric determination.

A geographic information system comprises a network interface configured to receive a proposed location for a geospatial entity from a mobile device, the proposed location determined by a wireless location system, and based upon a current location of the mobile device, the network interface provides information about the proposed location for the geospatial entity to a first plurality of other users who may be associated with the user who proposed the location. The network interface further receives votes from the first plurality of other users as to whether the proposed location is correct. Optionally, the network interface is further configured to provide information about the proposed location for the geospatial entity to a second plurality of other users and receives votes from the second plurality of other users.

The wireless location system is a global positioning system, cell phone tower triangulation system, or coarse wifi location system.

The geographic information system further comprises a database which is configured to store the proposed location for a geospatial entity as well as the votes from the first plurality of other users.

The geographic information system further comprises an entity location module configured to determine whether to update the location information for the geospatial entity responsive to the received votes from other users. Optionally the entity location module provides the corrected location information to an online map hosting system.

The features and advantages described in this summary and the following detailed description are not all-inclusive. Many additional features and advantages will be apparent to one of ordinary skill in the art in view of the drawings, specification, and claims hereof.

DETAILED DESCRIPTION OF THE DRAWINGS

System Overview

Figure 1:
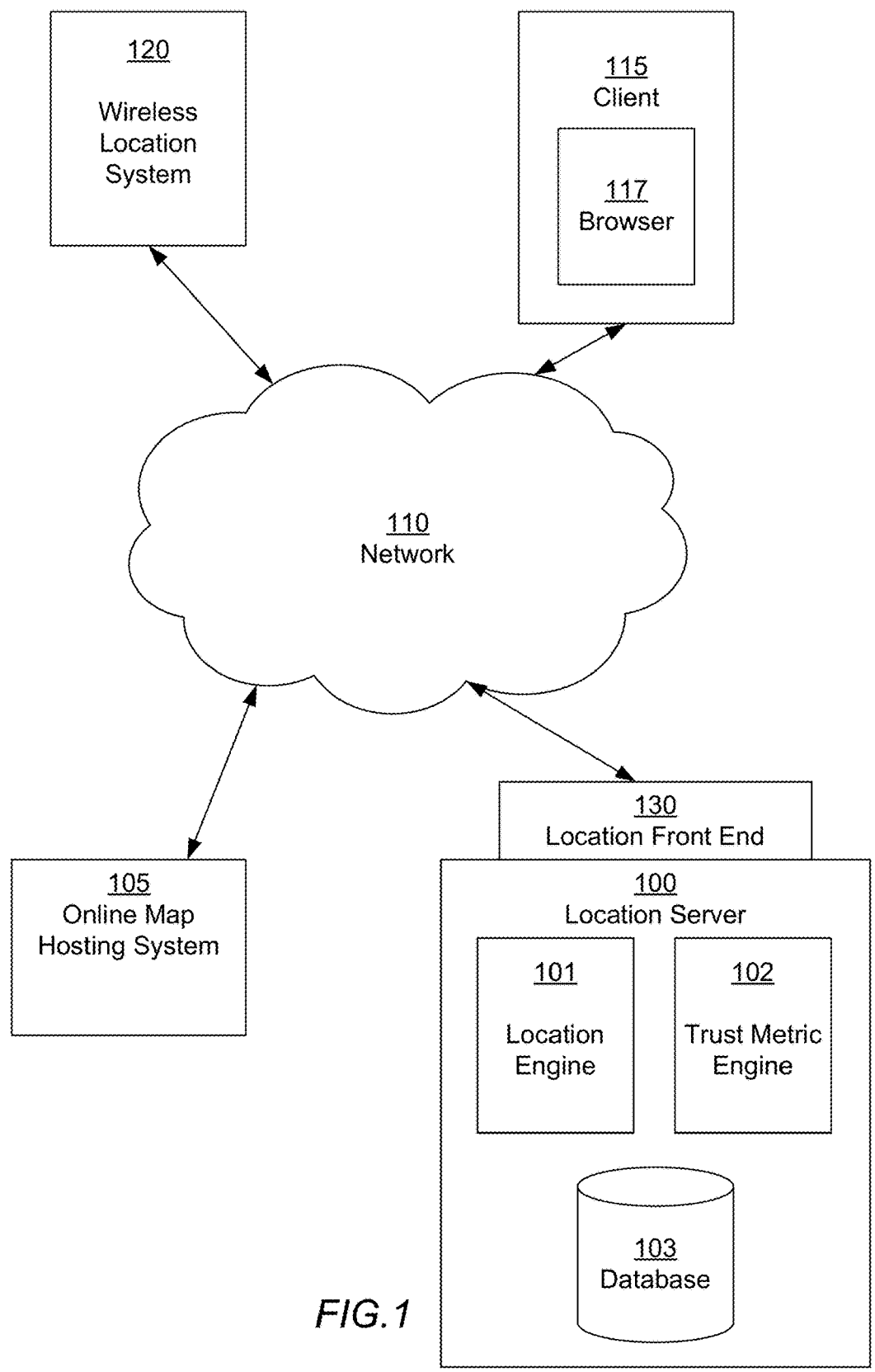
FIG. 1 is a diagram of system architecture.

FIG. 1 is a diagram of system architecture according to one embodiment. The location server 100 comprises a location engine 101, a trust metric engine 102 and a database 103. For simplicity, only one location server 100, one location engine 101 and one trust metric engine 102 are shown, but in practice many location servers 100, many location engines 101 and many trust metric engines 102 may be in operation.

The location server 100 communicates with the online map hosting system 105 and client 115 via its location front end 130 and the network 110. The network 110 is typically the Internet, but may also be any network, including but not limited to a LAN, a MAN, a WAN, a mobile, wired or wireless network, telecommunication network, a private network, or a virtual private network, and any combination thereof.

The client 115 is any type of device that is adapted to access the location server 100 over the network 110. Examples of clients include, but are not limited to, mobile devices such as a handheld computer, laptop computer, tablet computer, mobile phone or personal digital assistant (PDA) and devices that receive map information and wireless location system information such as navigation devices, which have been adapted to provide the structures and functions described herein. Most basically, a client 115 is configured to determine its location, receive information from the user to tag a location, transmit a proposed location to the location server 100, and receive information describing proposed locations from the location server 100. The client 115 determines its location using the wireless location system 120.

The wireless location system 120 is a system which determines the location of the client 115 and transmits the location to the client 115. The client's location is defined by coordinates in two-dimensional or three-dimensional space. Examples include, but are not limited to, a global positioning system, cell phone tower triangulation and wi-fi localization.

The client 115 further comprises a client application for receiving the user input information and receiving information about proposed locations from the location server 100. In one embodiment the client application is a browser 117. The browser 117 is any browser known in the art. In addition to the location server 100, the client 115 communicates with the wireless location system 120 via the network 110. Optionally, the client 115 is in communication with the online map hosting system 105 via the network 110. For simplicity only one client 115 is shown. In practice, very large numbers (e.g., millions) of clients 115, or as many as can be supported by the hardware and software implementation, can be in communication with the location server 100 at any time.

The location server 100 is implemented as server program executing on one or more server-class computers comprising a CPU, memory, network interface, peripheral interfaces, and other well known components. The computers themselves preferably run an open-source operating system such as LINUX, have generally high performance CPUs, with 1G or more of memory, and 100G or more of disk storage. Of course, other types of computers can be used, and it is expected that as more powerful computers are developed in the future, they can be configured in accordance with the teachings here. The functionality implemented by any of the elements can be provided from computer program products that are stored in tangible computer accessible storage mediums (e.g., RAM, hard disk, or optical/magnetic media), or by equivalent implementations in hardware and/or firmware.

The location engine 101 receives proposed locations for geospatial entities and indexes and stores the proposed locations in the database 103. A geospatial entity is an entity that is associated with a geographic location (either a point or a region); the entity may be associated with the geographic location by being located there, either currently or at some point in the past. Examples of entities include, but are not limited to, points of interest (POI), bodies of water, mountains, forests, cities, addresses, streets, businesses, buildings, historic sites, historic events (e.g., the location of Custer's Last Stand, or Woodstock) and landmarks. Additionally, the location engine 101 provides the proposed locations to other users of the location server 100.

Figure 2:
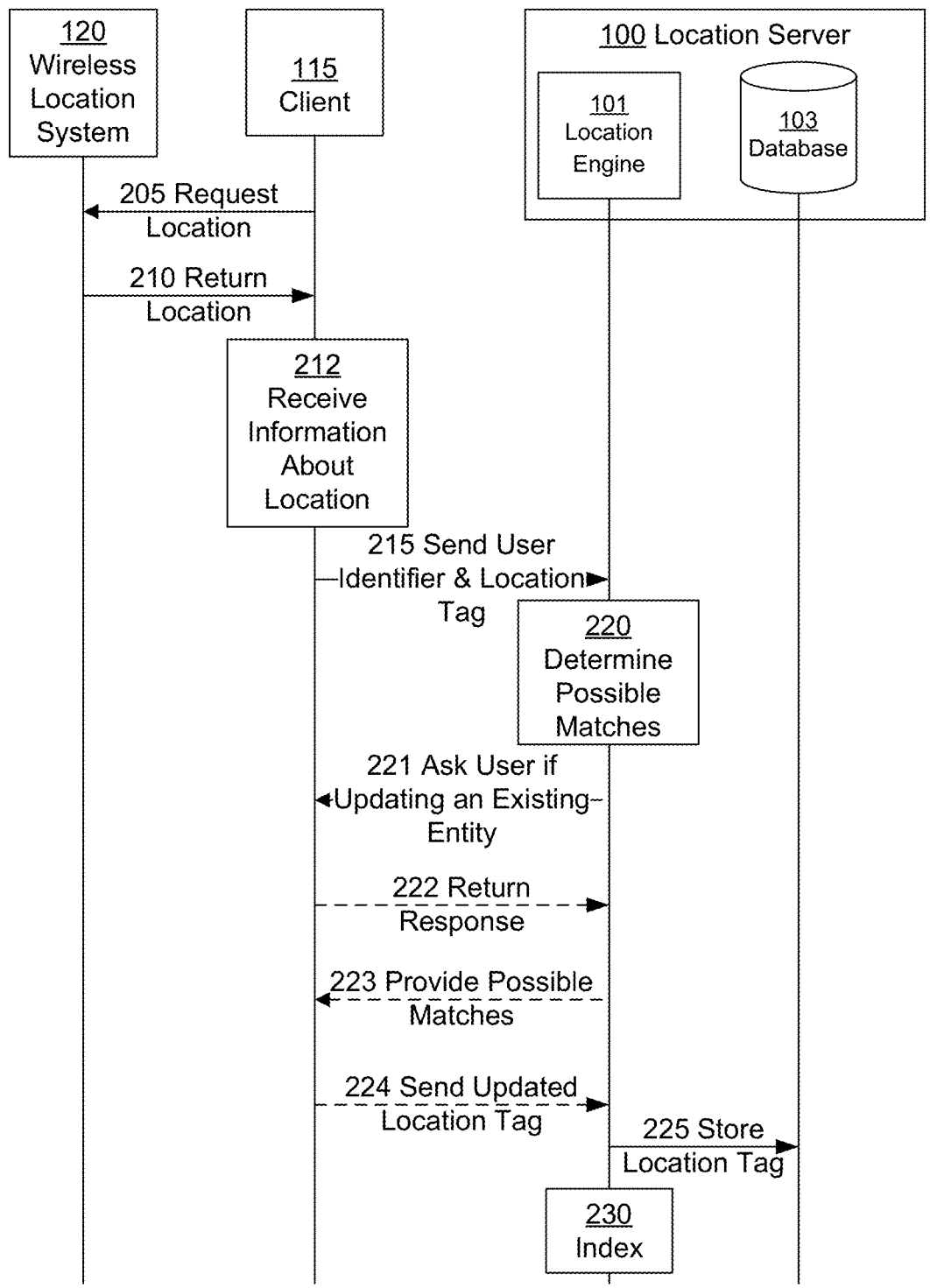
FIG. 2 is a data flow chart illustrating the method of tagging a location on a map.

The trust metric engine 102 determines a trust metric for the proposed location based on votes received from other users indicating whether the other users agree or disagree with the proposed location The votes are used to determine a trust metric which is a measure of the trustworthiness of the proposed location. If a proposed location generates sufficient agreement and is thus sufficiently trustworthy, this is reflected in the value of the trust metric and the location server 100 provides the proposed location to all users responsive to the value of the trust metric. Optionally, the location server 100 provides the proposed location to the online map hosting system 105. The operation of the trust metric engine 102 is described in greater detail in reference to FIGS. 2 and 3.

The database 103 stores the proposed locations for geospatial entities, votes from other users in response to proposed location, as well as the trust metric for the proposed locations. Additionally, the database 103 stores information associated with users of the location server 100. Information associated with users includes metadata about the user, a user's list of contacts, an identifier unique to the user and interactions with other users of the location server 100. In one embodiment, the database 103 is structured using a BigTable database model, as provided by Google Inc. and described more fully in "Bigtable: A Distributed Storage System for Structured Data" by Fay Chang, Jeffrey Dean, Sanjay Ghemawat, Wilson C. Hsieh, Deborah A. Wallach, Mike Burrows, Tushar Chandra, Andrew Fikes and Robert E. Gruber published in *Proceedings of the 7th USENIX Symposium on Operating Systems*, pp 205-218, 2006, which is hereby incorporated by reference.

The online map hosting system 105 is any web-based application known in the art that provides maps to users. An exemplary online map hosting system is GOOGLE™ Maps. Upon receiving the proposed location from the location server 100, the online map hosting system 105 may incorporate the proposed location in maps provided by the online map hosting system 105 to its users.

Process Overview—Location Tagging

Figure 3A:
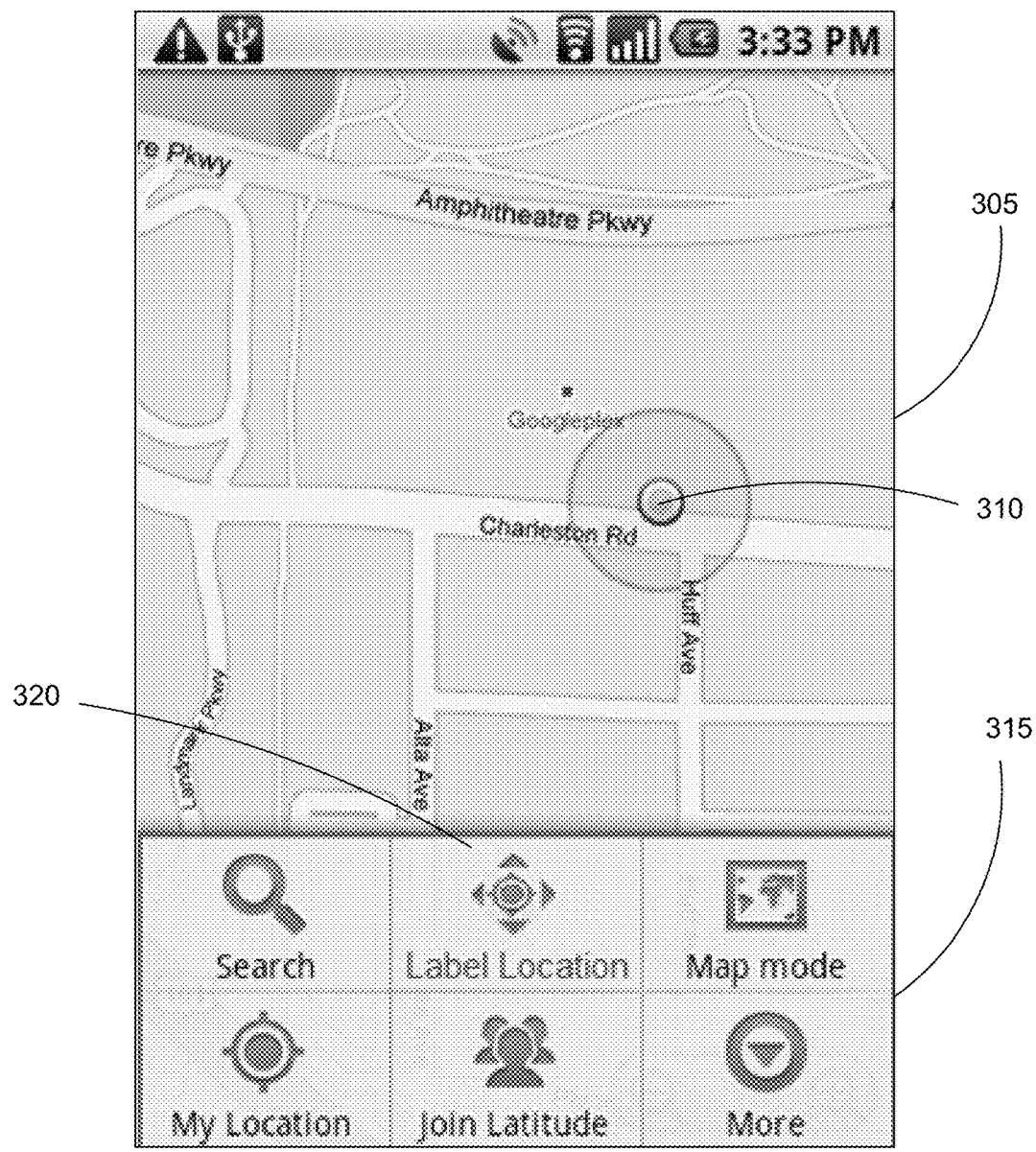
FIGS. 3A-3F are screenshots illustrating the method of tagging a location on a map.

The process of receiving a proposed location for an entity is described in reference to FIGS. 2 and 3A-3F. FIG. 3A illustrates a map 305 displayed to a user in a browser 117 at a client 115; for the purposes of reference, this user will be referred to as the "tagging user." The tagging user's current location is indicated by a location marker 310, here a small circular icon. To determine the placement of the marker, the client 115 requests 205 its location from the wireless location system 120. The location is returned 210 and the client 115 displays the location marker 310 to the user on the map 305. Also displayed to the user is a menu 315. One of the buttons displayed on the menu 315 is "Label Location" 320. To propose a tag for the tagging user's current location 310 identifying the location as being the location of a geospatial entity, the user selects the Label Location 320 button.

Figure 3B:
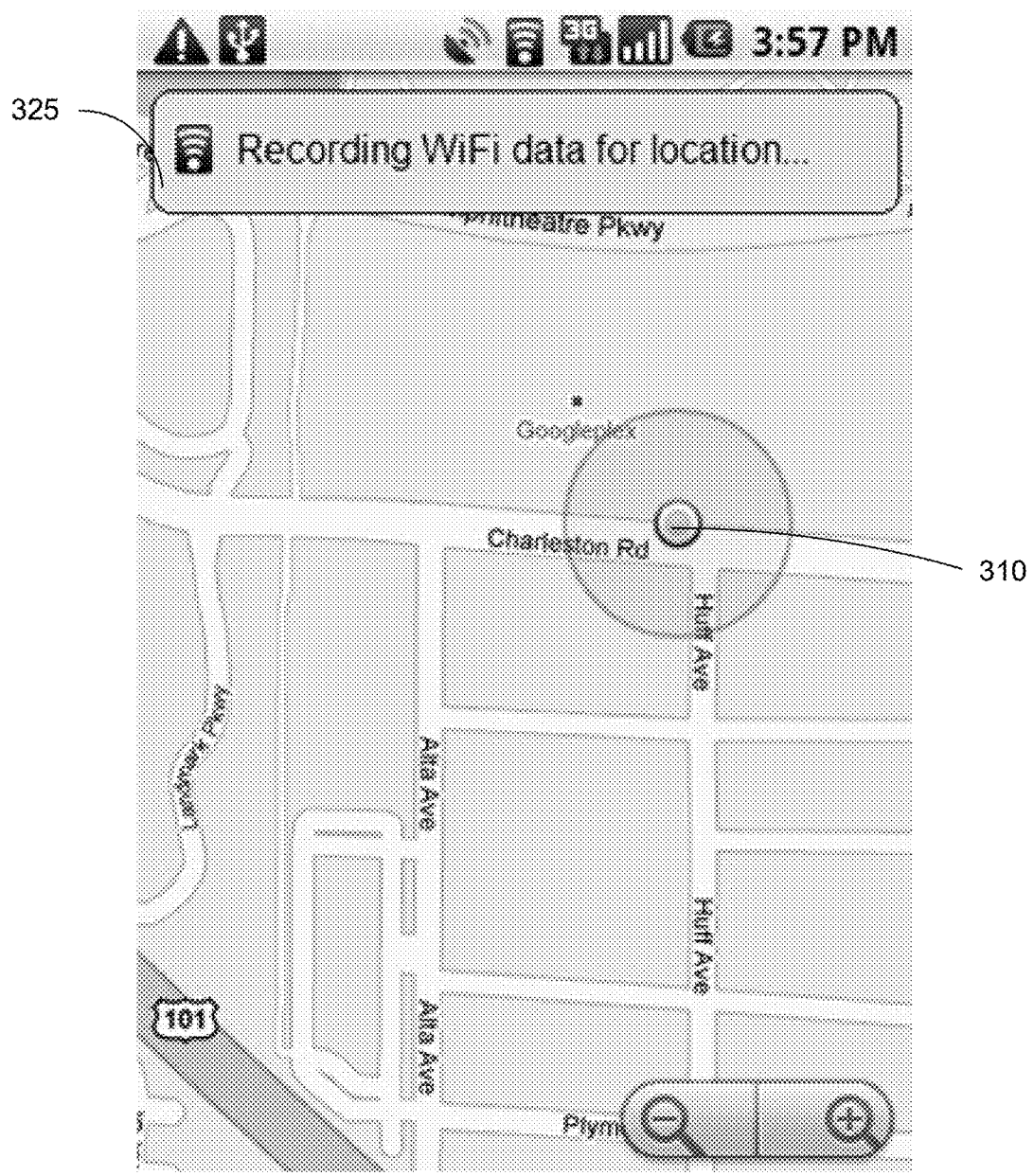

FIG. 3B illustrates the client 115 requesting 205 its location from the wireless location system 120. A status dialog box 325 illustrates the location being requested based on upon local wireless networks in the vicinity of the client 115. Alternatively, the client 115 does not request its location again and instead uses the previously transmitted location (as shown in FIG. 3A) for transmitting with the proposed location.

Figure 3C:
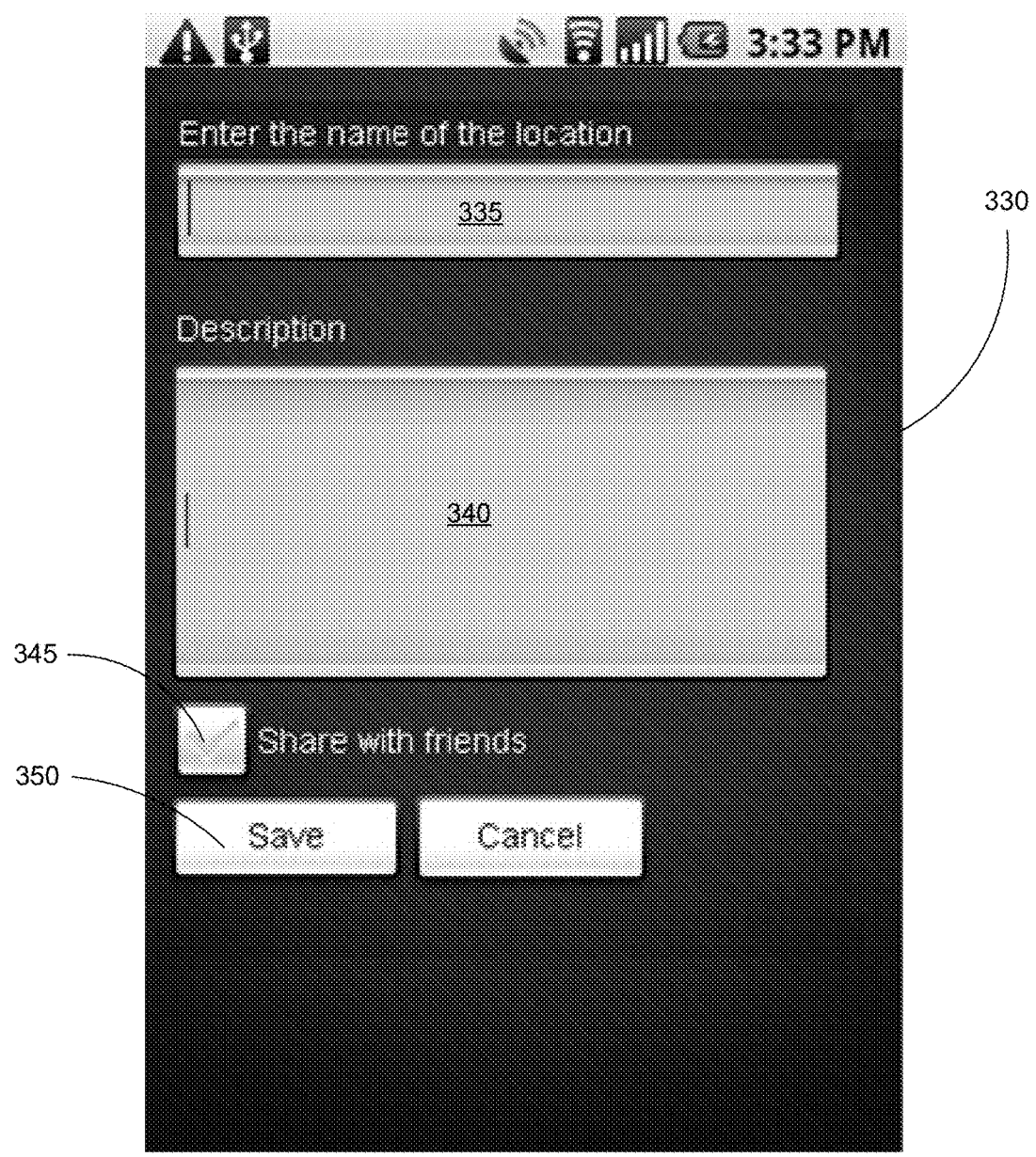

In the next step, the user enters information about the geospatial entity being tagged. The information from the user is received 212 by the client 115. FIG. 3C illustrates a dialog box 330 with which the user enters information describing the geospatial entity for which the location is being proposed. The dialog box 330 comprises a name field 335 for entering the name of the entity and a description field 340 for entering additional descriptive information. The user can check box 345 to share the proposed location for the geographic entity with other users. Selection of the save button 350 sends 215 a location tag along with an identifier to identify the user to the location engine 101. The location tag comprises the location as determined by the wireless location system 120 and the descriptive information provided by the user of what the location is.

Examples of locations that a user would tag include a new geospatial entity that was not previously on the map such as a new business (e.g., a new restaurant) or a new park. Alternatively, the user tags a location as a correction of inaccurate data on the map. For example, a restaurant may be displayed on the map as being in one location (e.g., on the end of a block right on the corner) when in reality the restaurant is some other location (e.g., in the middle of the block). While at the actual, correct location of the restaurant, the user tags the restaurant's location thereby proposing a corrected location of a geospatial entity already on the map; once the proposed location has sufficient trust, it will be used to replace the incorrect location in the database 103. Entities displayed on maps shown to users include an option for the user to correct the location of that entity, for example through a menu item, button, or other selection mechanism. Once the trust metric for proposed location is sufficiently high, the proposed location is provided to the online map hosting system 105.

Figure 3D:
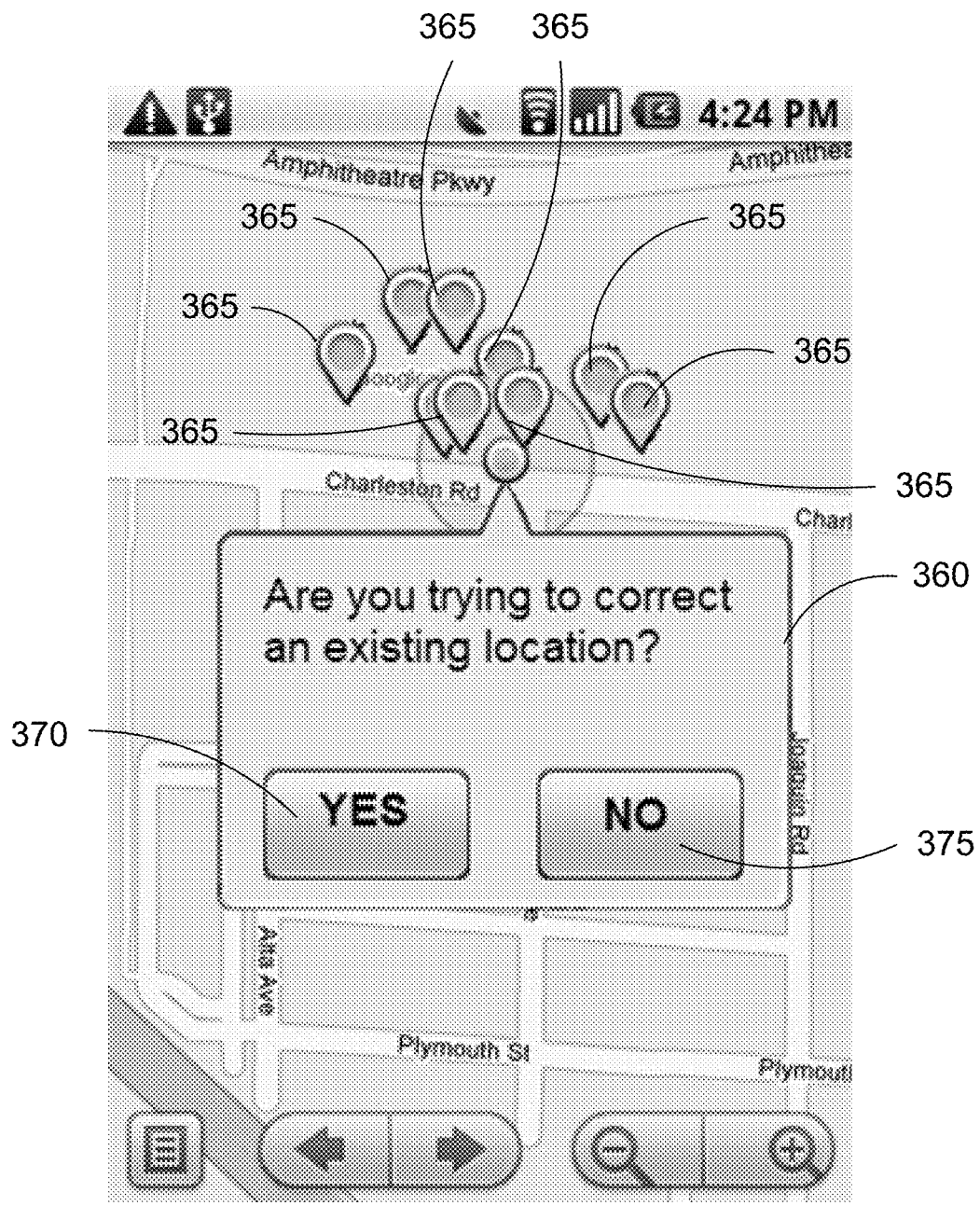

In one embodiment, upon receiving a location tag the location engine 101 determines 220 whether or not there are possible matches for the location tag by searching the online map hosting system 105 for any geospatial entities on the map within a pre-determined radius of the proposed location that match the proposed location. If there are, the location engine 101 asks 221 the user whether they are trying to update the location of an existing entity. FIG. 3D illustrates a dialog box 360 displayed to the user asking if the proposed location is a correction for existing locations identified with icons 365 which have been identified as possible matches. The user selects either the "Yes" button 370 or "No" button 375 and the response is returned 222 to the location engine 101. If the user selects the "No" 375 button, the system processes the received location tag as a proposed location for a new entity not previously on the map.

Figure 3E:
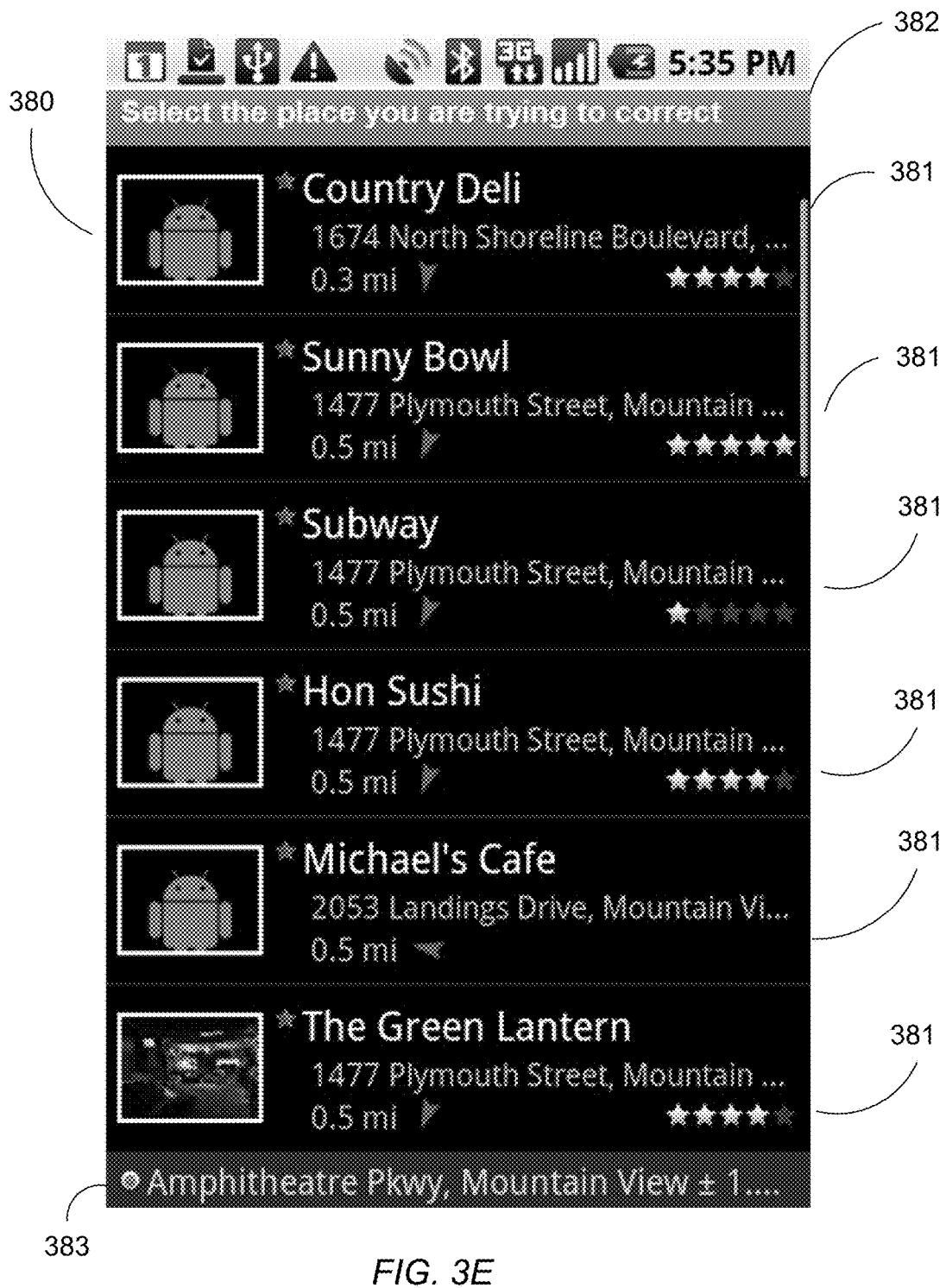
Figure 3F:
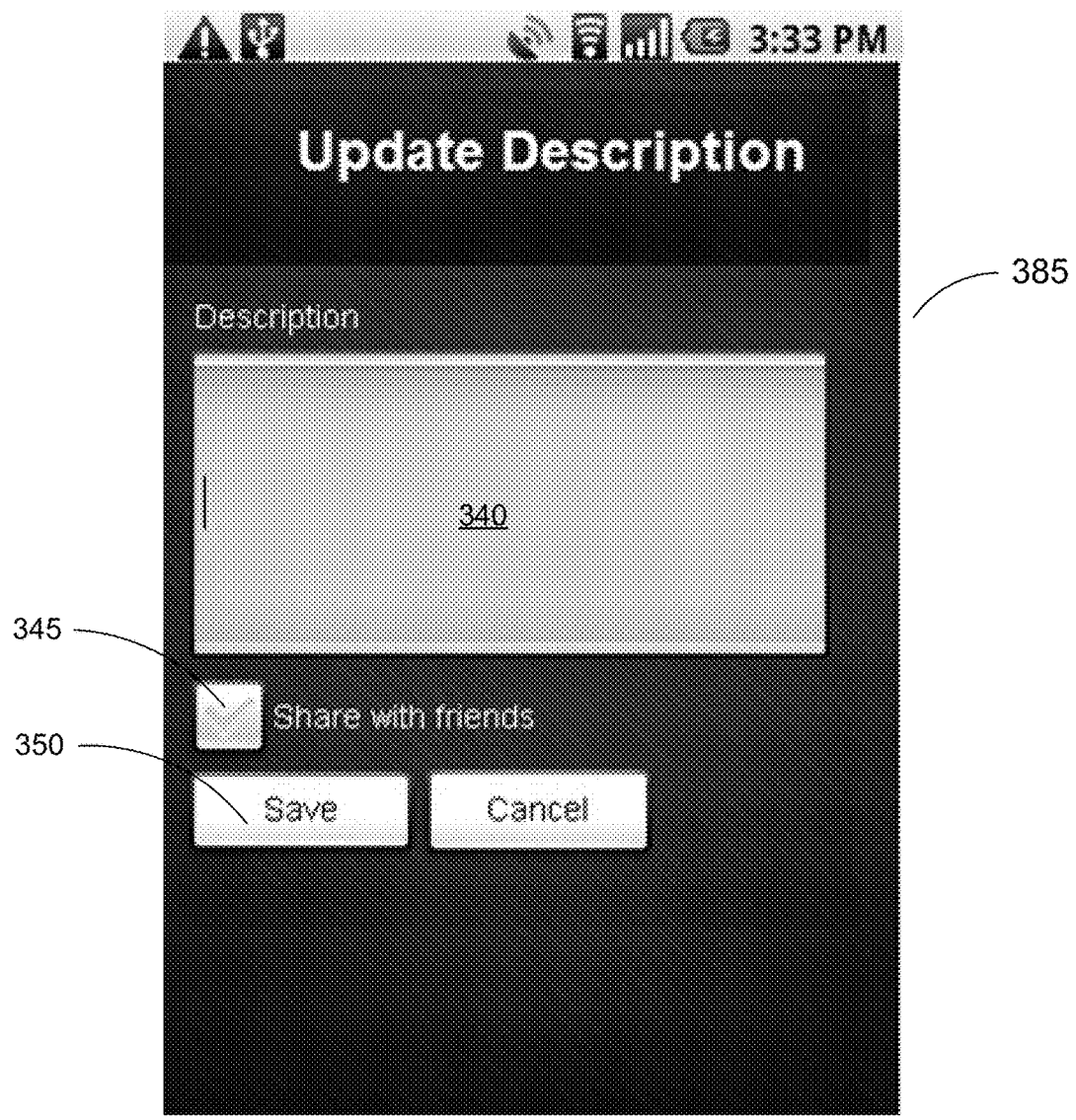

If the user selects the "Yes" button 370, the location engine 101 provides 223 the possible matching entities to the user. FIG. 3E illustrates a list 380 of possible matching entities 381 displayed to the user. The list includes the name of the possible matching entity as well as information about the entity such as its address and distance from the location tag sent 215 by the user. Additionally, instructions 382 are displayed to the user requesting the user to select the entity that the user is trying to correct. The address 383 for the location tag sent by the user is also displayed.

Upon the user selecting one of the possible matching entities 381, a dialog box is displayed for the user to enter additional information about the entity. The dialog box 385 comprises a description field 340 for entering additional descriptive information. The user can check box 345 to share the updated location for the geographic entity with other users. Selection of the save button 350 sends 224 the updated location tag to the location engine 101.

Referring again to FIG. 2, the remainder of the tagging process is described. The location engine 101 stores 225 the location tag at the database 103. If the location engine 101 determined possible matches for the location tag, the location tag is stored after receiving information from the user indicating whether or not the location tag is a new entity or a correction to an existing entity. The location tag is stored as associated with the received user identifier. The user identifier is later used to determine to which other users to provide the proposed location. The location engine 101 indexes 230 the received location tags according to, for example, the geographic location as indicated by a latitude and longitude obtained from GPS. Alternatively, the location tags are indexed according to signature of signal strengths of WiFi access points visible at that location. The indexing may be immediate or at predetermined intervals, such as hourly or daily. In yet another alternative, the indexing occurs when the server has sufficient idle processing capacity to do indexing.

Figure 4:
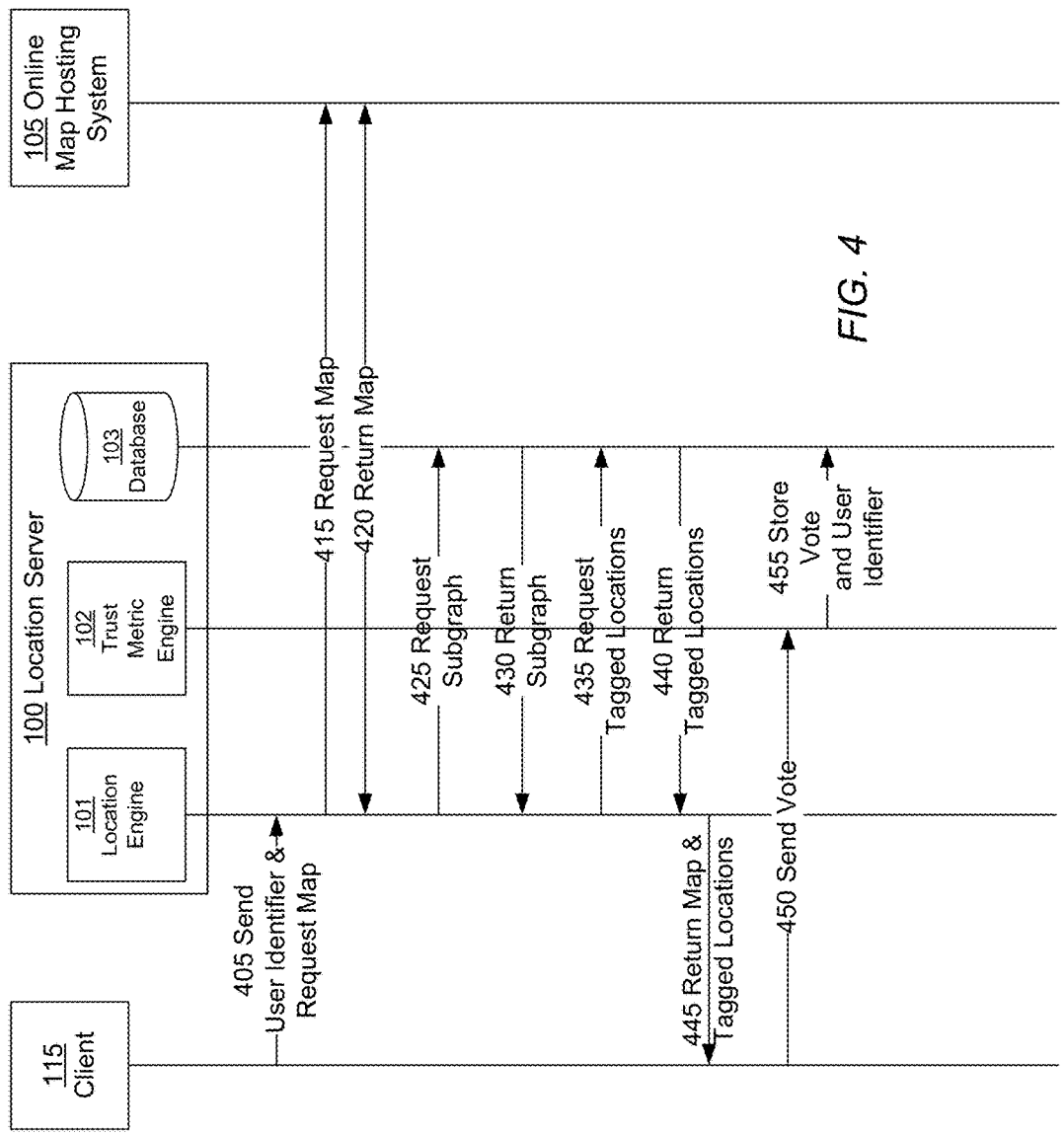
FIG. 4 is a data flow chart illustrating the method of providing proposed locations to users of a map.

FIG. 4 describes the process of displaying proposed locations to other users of the location server 100 according to one embodiment. A user of the location server 100, the "requesting user," requests 405 a map from the location server 100 and an identifier for the requesting user is sent with the request. The location server 100 in turn requests 415 a map from a online map hosting system 105 which returns 420 the map.

Additionally, the location engine 101 determines proposed locations tagged by other users to display on the map returned to the requesting user. Which proposed locations to include is determined using social graphs and subgraphs. All of the users of the location server 100 are considered part of a social graph which contains numerous subgraphs. A social graph, also referred to as a social network, is a group of interconnected nodes, where the nodes are the users of the location server 100 who are interconnected by a social relationship other than just being users of the location server 100. Subgraphs are created in a number of ways. A subgraph for a given user may be derived from the user's contact list, based upon other users with whom the user has exchanged email or text messages, or with whom the user is associated in a social network service, such as ORKUT™. For a given user, the subgraph may be based on any of these sources or similar sources, either alone or in combination. In one embodiment, the subgraphs used in this method have memberships where each member is directly connected to another member rather than indirectly.

Figure 5:
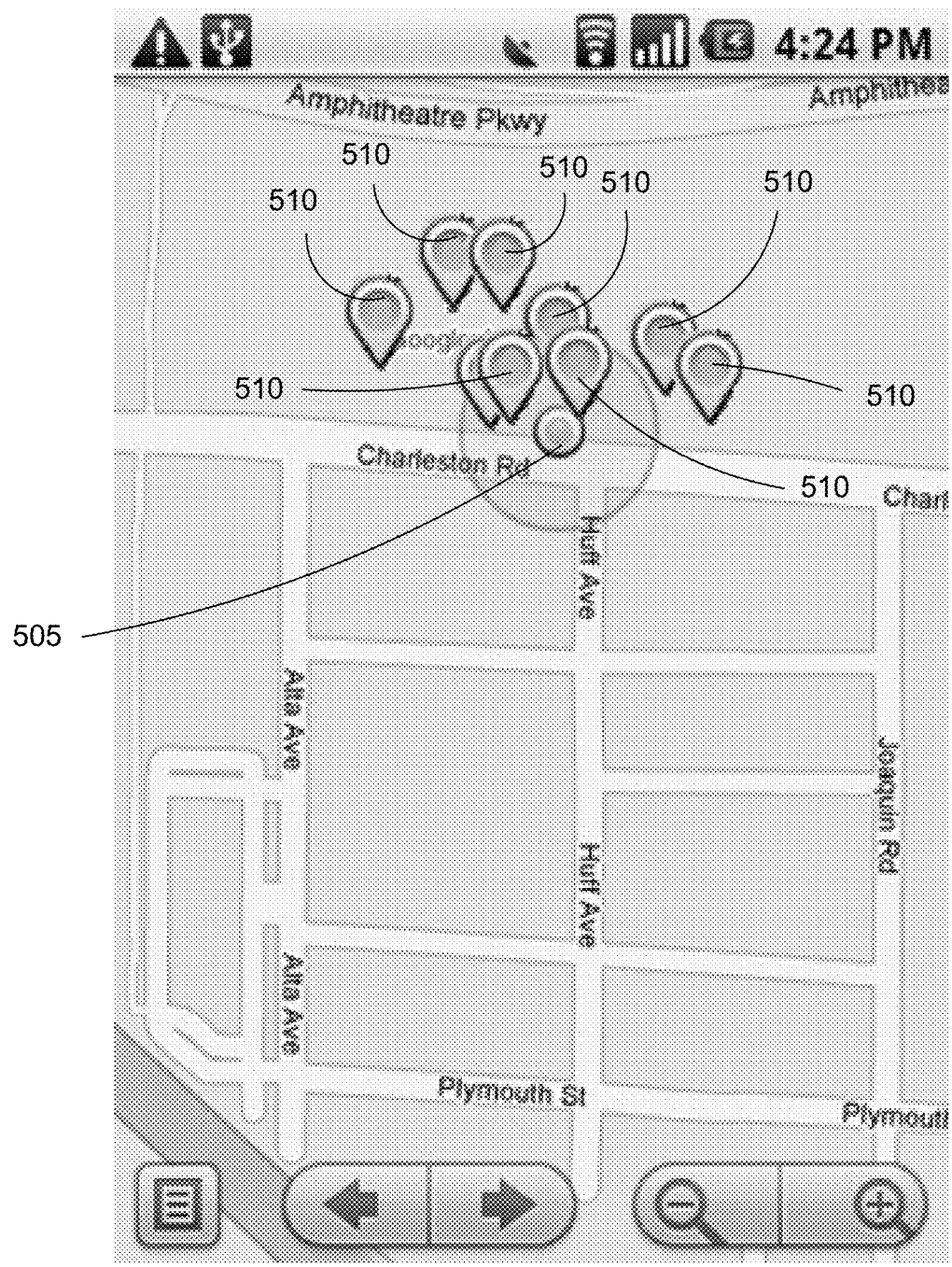
FIG. 5 is a screenshot of proposed locations shown on a map displayed to a user.

The location engine 101 requests 425 from the database 103 a subgraph of users of the location server 100 wherein the subgraph includes the requesting user. The database 103 returns 430 the requested subgraph to the location engine 101. The location engine 101 requests 435 from the database 103 the proposed locations tagged by the users who are part of the requested subgraph, and that are within the area of the map requested by the requesting user. Because the requesting user is a member of the subgraph, the proposed locations displayed to the requesting user will have been tagged by users somehow associated with the requesting user. The database 103 returns 445 proposed locations. The location engine 101 generates and returns 445 a map including the locations tagged by subgraph users. FIG. 5 is an example of such a map. The map shows an icon 505 where the requesting user is located as well as icons 510 for the locations nearby tagged by subgraph users.

In another embodiment the user requesting the map has subscribed to have proposed locations from certain other users or all other users displayed on maps requested by this user.

Figure 6:
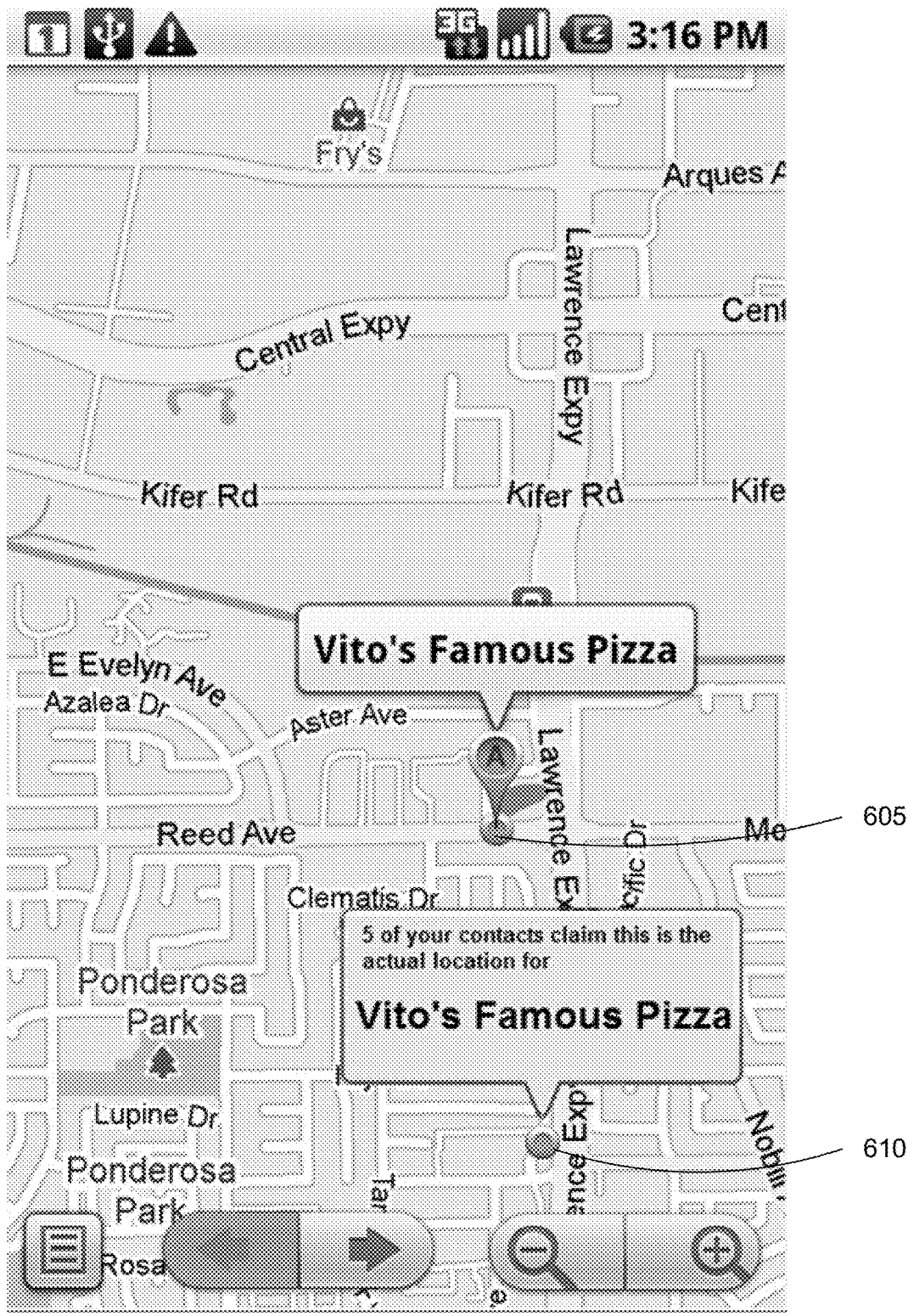
FIG. 6 is a screenshot of a proposed location displayed to a user wherein the proposed location is a correction to the location of a geospatial entity on a map.

Additionally or alternatively, a user can request a map by searching for a specific address or geospatial entity. FIG. 6 illustrates a map returned 345 to the user by the location engine 101 after a user searched for "Vito's Famous Pizza." The map displays the location 605 of Vito's Famous Pizza as provided by the online map hosting system 105 as well as a location 610 tagged by other users that proposes a corrected location for Vito's Famous Pizza. In the example illustrated in FIG. 6, the fact that the other users are 5 of the requesting user's contacts, is also displayed to the requesting user on the map.

Figure 7:
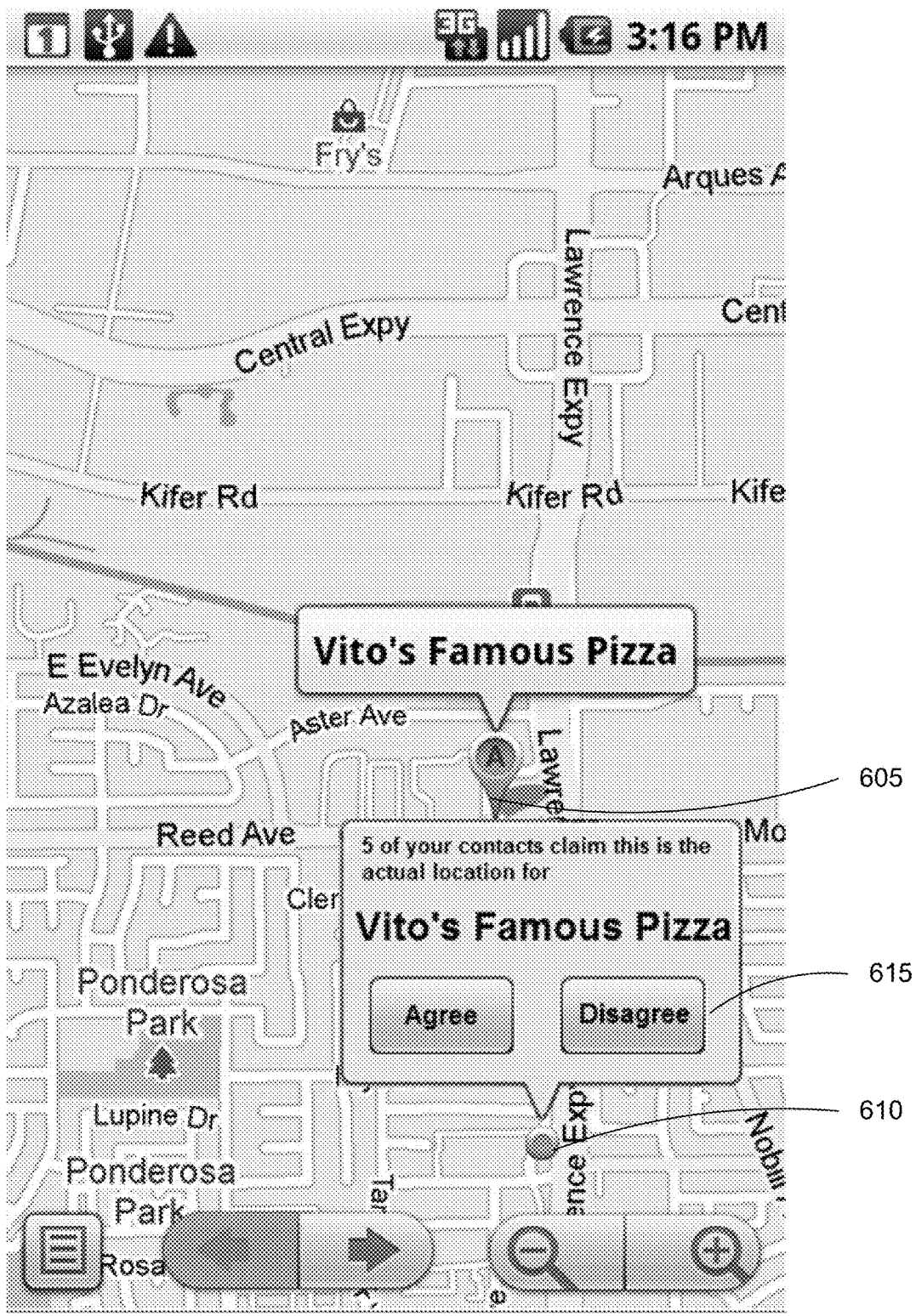
FIG. 7 is a screenshot of a proposed location displayed to the user with a dialog box for a user to vote on the proposed correction.

As illustrated in FIG. 7, the proposed location 610 for Vito's Famous Pizza is accompanied by a dialog box 615 for the requesting user to vote whether or not she agrees that the proposed location is the correct location for Vito's Famous Pizza. The requesting user chooses whether or not she agrees with the proposed location. Returning to FIG. 4, the requesting user's vote is sent 450 by the client 115 to the trust metric engine 102 which stores 455 the vote as well as the user identifier of this user in the database 130. Additionally, the requesting user can choose to share the proposed location with the user's contacts on the location server 100.

Process Overview—Updating Map Information

Figure 8:
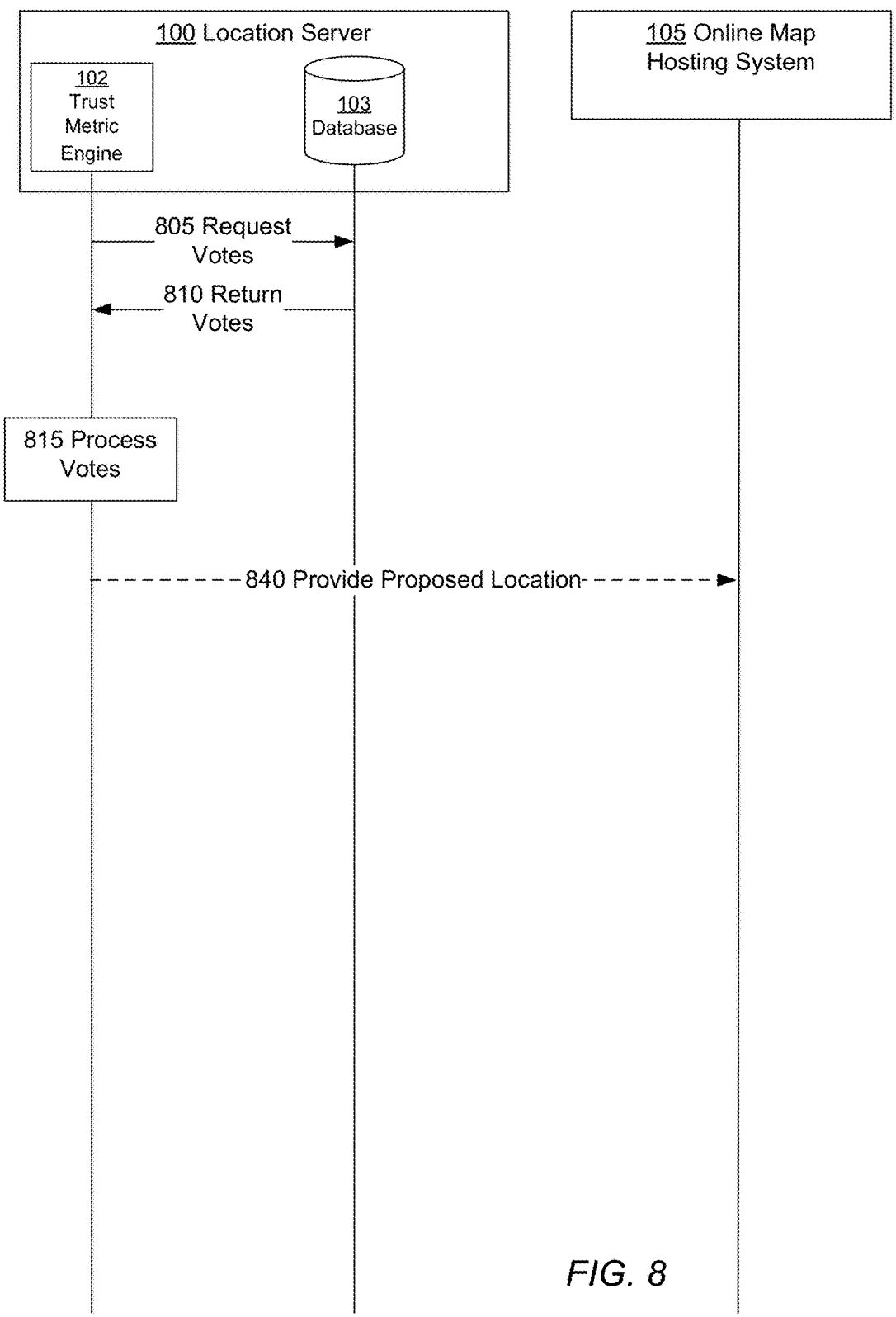
FIG. 8 is a data flow chart illustrating determination of a trust metric and providing a proposed location to a online map hosting system.

FIG. 8 illustrates the process of determining the trust metric for a proposed location. The trust metric engine 102 requests 805 stored votes for a given proposed location which are returned 810 by the database 103. The trust metric engine 102 then processes 815 the votes to determine the trust metric. The votes are requested and processed periodically, for example hourly or daily. Processing 815 comprises determining for a given proposed location whether a sufficient number of votes have been received to determine a trust metric, and then determining the trust metric based on the votes. The trust metric can be determined based on a number of factors. In one embodiment, the trust metric is simply the absolute number of votes agreeing with the proposed location. Alternatively the trust metric is the percentage of the received votes agreeing with the proposed location. Responsive to the value of trust metric, the proposed location is provided 840 to the online map hosting system 105. In one embodiment, the proposed location is provided to the online map hosting system 105 responsive to the value of the trust metric exceeding a threshold. The threshold used varies, for example with the type and location of geospatial entity being tagged. The online map hosting system 105 may choose to incorporate the proposed location in all maps provided by the online map hosting system 105.

Optionally, determining the trust metric for proposed location comprises providing the proposed location to more than one subgraph of users. The proposed location is provided to a first plurality of users associated with the tagging user as described previously. The users in this first subgraph are the users of the location server 100 that are directly associated with the tagging user such as users listed in the tagging user's contact list. A second plurality of users, an additional subgraph, is also identified and the proposed location is provided to the additional subgraph as well. The additional subgraph preferably has only minimal or no overlap with the first subgraph. The additional subgraph may be users directly associated with one of the users in the first subgraph, but not directly associated with the tagging user. For example, if the first subgraph was the contact list of the tagging user, the additional subgraph can be the contact list of one of the users in the subgraph provided that that contact list has minimal or no overlap with the contact list of the tagging user. Minimal overlap is less than 10% and preferably less than 5%. Alternatively, if there is overlap between the first subgraph and the additional subgraph, the users that appear in both are removed when defining the additional subgraph. In yet another alternative, the additional subgraph comprises a subset of the contact list of more than one of the users in the first subgraph where the membership of the additional subgraph has minimal or no overlap with the membership of the first subgraph.

The proposed location can be provided to an additional subgraph of users through the actions of other users. As explained previously, when a proposed location is provided to a user, the user may have the option to propagate that proposed location to the user's contacts or friends. In such an embodiment, if a user in the first subgraph opts to share the proposed location to the user's contact list, this action provides the proposed location to an additional subgraph of users provided that the overlap between the user's contact list and the first subgraph is minimal. If the overlap between the user's contact list and the first subgraph is too high, the sharing of the proposed location is not considered an additional subgraph.

Votes from the multiple subgraphs are used to determine the trust metric and responsive to the trust metric exceeding a threshold, the proposed location is provided to the online map hosting system 105.

The advantage to using multiple subgraphs with minimal overlap is that confirmation of a proposed location is received from users who are directly associated with the tagging user as well as those who are not directly associated with the tagging user. Graph-based systems are better at capturing trust-based relationships than random samples. The users who are directly associated with the tagging user presumably know the tagging user and are more likely to trust the tagging user. They are therefore more likely to follow the advice of the tagging user and therefore go to the proposed location and therefore be in a position to vote in agreement or disagreement. Additionally, users who know the tagging user are more likely to respond honestly as to whether they agree or disagree with the proposed location. In one embodiment, the tagging user can not see how other users have voted on the proposed location. This further increases likelihood that the other users will vote honestly in response to the proposed location.

However, a subgraph may be more homogeneous than a random sample and so its members may share a bias. Using a second subgraph that has little to no overlap with the first subgraph counteracts this downside using a group that is more homogeneous than a random sample of users. An example of such a bias displayed overtly is a user tagging a competing business location incorrectly so that it cannot be found and the other users who are on the tagging user's contact list confirming the incorrect tag to support the tagging user's business.

In one embodiment, when multiple subgraphs are used, the votes received from different subgraphs are weighted differently when determining the trust metric.

Alternatively, the first vote from each subgraph has the same weight and this is the maximum weight given to any vote from users regardless of subgraph. Then each additional vote from a subgraph is given less weight than the first. In this method, votes from multiple subgraphs are favored and a sufficient trust metric is established more quickly when the proposed location is propagated to more subgraphs.

Optionally, an additional step in determining whether there is sufficient agreement with the proposed location comprises providing the proposed location to random users of the location server 100. These users are not necessarily part of a subgraph together with the tagging user or any members of the first or additional subgraphs nor are the random users in a subgraph with each other. These votes are then also added to the trust metric determination.

In one embodiment, the trust metric is determined as follows $$\sum_{i=1}^{n}\sum_{j=1}^{m}U_j W_{ij}$$

wherein: there are one or more subgraphs, $S_j$; $U_j$ are votes from users in the subgraphs; and $W_{ij}$ is the weight for the vote given the subgraph.

The present invention has been described in particular detail with respect to several possible embodiments. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of methods and symbolic representations of operations on information. These descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of a method. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The methods and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet, public networks, private networks, or other networks enabling communication between computing systems. Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

The invention claimed is:

1. A computer-implemented method of updating geospatial entities on maps, the method comprising:
    receiving, by one or more computing devices, from a computing device operated by a first user, a proposed location for a new geospatial entity, the proposed location determined by a wireless location system, and based upon a current location of the computing device;
    receiving, by the one or more computing devices, from a first plurality of other users a request for a map comprising the proposed location, wherein the first plurality of other users is connected to the first user in a first social network;
    responsive to the request, providing, by the one or more computing devices, the map comprising the proposed location for the new geospatial entity to a first subgraph of users and a second subgraph of users, the first subgraph of users comprising the first plurality of other users, and the second subgraph of users comprising a second plurality of other users wherein each of the second plurality of other users is associated with at least one of the first plurality of other users, and wherein the first subgraph of users and the second subgraph of users does not include the first user;
    providing, by the one or more computing devices, a user interface requesting the first subgraph users and the second subgraph of users to vote whether the proposed location for the new geospatial entity is correct via user interaction with the user interface to indicate the respective vote;
    receiving, by the one or more computing devices, via the user interface votes as to whether the proposed location for the new geospatial entity is correct;
    determining, by the one or more computing devices, a trust metric indicating a measure of trustworthiness of the proposed location responsive to the votes, wherein an initial vote from the first subgraph of users is afforded a higher weight than subsequent votes from the first subgraph of users and an initial vote from the second subgraph of users is afforded a higher weight than subsequent votes from the second subgraph of users, and wherein the trust metric is based at least in part on how many different subgraphs of users provide votes as to whether the proposed location for the new geospatial entity is correct;
    responsive to the trust metric, determining, by the one or more computing devices, whether to add the new geospatial entity at the proposed location to a database of geospatial entities for maps; and
    adding, by the one or more computing devices, the new geospatial entity to the map responsive the trust metric exceeding a threshold that is based at least in part on the votes from at least one of the subgraphs, via interaction with an online map hosting system associated with the map.

2. The method of claim 1, wherein each of the second plurality of other users is in a second social network with at least one of the plurality of other users.

3. The method of claim 1, wherein there is minimal overlap between the users in the first plurality of other users and the second plurality of other users.

4. The method of claim 1, wherein there is less than 5% overlap between the users in the first plurality of other users and the second plurality of other users.

5. The method of claim 1, wherein the trust metric weighs votes from the first subgraph of users differently than the second subgraph of users.

6. The method of claim 2, wherein the first user is not a member of the second social network.

7. The method of claim 1, wherein determining whether to add the new geospatial entity at the proposed location responsive to the trust metric comprises determining whether the trust metric exceeds the threshold.

8. The method of claim 7, wherein the new geospatial entity has a type and the threshold is different for different types of geospatial entities.

9. A computer-implemented geographic information system comprising:
    a processor for executing program code; and
    a non-transitory computer-readable storage medium storing program code executable to perform steps comprising:
    receiving from a computing device operated by a first user, a proposed location for a new geospatial entity, the proposed location determined by a wireless location system, and based upon a current location of the computing device;
    receiving from a first plurality of other users a request for a map comprising the proposed location, wherein the first plurality of other users is connected to the first user in a first social network;
    responsive to the request, providing the map comprising the proposed location for the new geospatial entity to a first subgraph of users and a second subgraph of users, the first subgraph of users comprising the first plurality of other users, and the second subgraph of users comprising a second plurality of other users wherein each of the second plurality of other users is associated with at least one of the first plurality of other users;
    providing a user interface requesting at least one of the first subgraph users and the second subgraph of users to vote whether the proposed location for the new geospatial entity is correct via user interaction with the user interface to indicate the respective vote;
    receiving via the user interface votes as to whether the proposed location for the new geospatial entity is correct;
    determining a trust metric indicating a measure of trustworthiness of the proposed location responsive to the votes, wherein an initial vote from the first subgraph of users is afforded a higher weight than subsequent votes from the first subgraph of users and an initial vote from the second subgraph of users is afforded a higher weight than subsequent votes from the second subgraph of users, and wherein the trust metric is based at least in part on how many different subgraphs of users provide votes as to whether the proposed location for the new geospatial entity is correct;
    responsive to the trust metric, determining whether to add the new geospatial entity at the proposed location to a database of geospatial entities for maps; and
    adding the new geospatial entity to the map responsive the trust metric exceeding a threshold that is based at least in part on the votes from at least one of the subgraphs, via interaction with an online map hosting system associated with the map.

10. The system of claim 9, wherein each of the second plurality of other users is in a second social network with at least one of the plurality of other users.

11. The system of claim 9, wherein there is minimal overlap between the users in the first plurality of other users and the second plurality of other users.

12. The system of claim 9, wherein there is less than 5% overlap between the users in the first plurality of other users and the second plurality of other users.

13. The system of claim 9, wherein the trust metric weighs votes from the first subgraph of users differently than the second subgraph of users.

14. The system of claim 9, wherein determining whether to add the new geospatial entity at the proposed location responsive to the trust metric comprises determining whether the trust metric exceeds the threshold.

15. The system of claim 14, wherein the new geospatial entity has a type and the threshold is different for different types of geospatial entities.

16. A non-transitory computer-readable storage medium with an executable program stored thereon, wherein the program instructs one or more processors to perform steps comprising:
- receiving from a computing device operated by a first user, a proposed location for a new geospatial entity, the proposed location determined by a wireless location system, and based upon a current location of the computing device;
- receiving from a first plurality of other users a request for a map comprising the proposed location, wherein the first plurality of other users is connected to the first user in a first social network;
- responsive to the request, providing the map comprising the proposed location for the new geospatial entity to a first subgraph of users and a second subgraph of users, the first subgraph of users comprising the plurality of other users, and the second subgraph of users comprising a second plurality of other users wherein each of the second plurality of other users is associated with at least one of the first plurality of other users;
- providing a user interface requesting the first subgraph of users and the second subgraph of users to vote whether the proposed location for the new geospatial entity is correct via user interaction with the user interface to indicate the respective vote;
- receiving via the user interface votes as to whether the proposed location for the new geospatial entity is correct;
- determining a trust metric indicating a measure of trustworthiness of the proposed location responsive to the votes, wherein an initial vote from the first subgraph of users is afforded a higher weight than subsequent votes from the first subgraph of users and an initial vote from the second subgraph of users is afforded a higher weight than subsequent votes from the second subgraph of users, and wherein the trust metric is based at least in part on how many different subgraphs of users provide votes as to whether the proposed location for the new geospatial entity is correct;
- responsive to the trust metric, determining whether to add the new geospatial entity at the proposed location to a database of geospatial entities for maps; and
- adding the new geospatial entity to the map responsive the trust metric exceeding a threshold that is based at least in part on the votes from at least one of the subgraphs, via interaction with an online map hosting system associated with the map.

17. The non-transitory computer-readable storage medium of claim 16, wherein each of the second plurality of other users is in a second social network with at least one of the plurality of other users.

18. The non-transitory computer-readable storage medium of claim 17, wherein the trust metric weighs votes from the first subgraph of users differently than the second subgraph of users.

19. The non-transitory computer-readable storage medium of claim 16, wherein determining whether to add the new geospatial entity at the proposed location responsive to the trust metric comprises, determining whether the trust metric exceeds the threshold.

20. The non-transitory computer-readable storage medium of claim 19, wherein the new geospatial entity has a type and the threshold is different for different types of geospatial entities.

* * * * *